US006442672B1

(12) United States Patent
Ganapathy

(10) Patent No.: US 6,442,672 B1
(45) Date of Patent: Aug. 27, 2002

(54) METHOD FOR DYNAMIC ALLOCATION AND EFFICIENT SHARING OF FUNCTIONAL UNIT DATAPATHS

(75) Inventor: Kumar Ganapathy, Lake Forest, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/163,741

(22) Filed: Sep. 30, 1998

(51) Int. Cl.$^7$ .............................. G06F 5/06; G06F 9/30; G06F 13/40; G06F 13/16
(52) U.S. Cl. .................. 712/201; 712/213; 712/211; 712/248; 712/217; 710/41; 710/104; 710/131
(58) Field of Search .......................... 712/1, 10, 16, 712/23, 28, 32, 35, 39, 43, 208, 221, 229, 3, 217, 228, 39.278, 211, 212, 209, 24, 210, 36, 205, 213, 206, 5, 6, 248, 245, 227, 181, 201; 375/240.25; 714/718, 733, 742, 743; 710/9, 129, 62, 104, 41, 131; 348/567, 584; 326/46

(56) References Cited

U.S. PATENT DOCUMENTS

| 4,484,268 A | | 11/1984 | Thoma et al. ............... 712/212 |
| 4,969,148 A | * | 11/1990 | Nadeau-Dosite et al. ... 714/718 |
| 5,465,377 A | * | 11/1995 | Blaner et al. .................. 712/23 |
| 5,487,024 A | * | 1/1996 | Girardeau, Jr. ............. 708/606 |
| 5,598,546 A | * | 1/1997 | Blomgren .................... 712/209 |
| 5,713,012 A | * | 1/1998 | Tanaka et al. ............... 712/233 |
| 5,790,824 A | * | 8/1998 | Asghar et al. ............... 712/209 |
| 5,864,689 A | | 1/1999 | Tran ............................ 712/208 |
| 5,903,310 A | * | 5/1999 | Finotello et al. ........ 375/240.25 |
| 5,940,311 A | * | 8/1999 | Dao et al. .................... 708/204 |
| 5,970,241 A | * | 10/1999 | Deao et al. .................. 395/568 |
| 6,029,240 A | * | 2/2000 | Blaner et al. .................. 712/23 |
| 6,044,453 A | * | 3/2000 | Paver ........................... 712/201 |
| 6,049,882 A | * | 4/2000 | Paver ........................... 713/322 |

OTHER PUBLICATIONS

"Selecting Predecoded Instructions with a Surrogate", *IBM Technical Disclosure Bulletin*, vol. 36, No. 6A, Jun. 1993, pp. 35–38.

C.W. Moser, Jr., "Increasing an Instruction Set Without Increasing Word Length", *Electronics*, vol. 48, No. 3, Feb. 1975, pp. 114–115.

* cited by examiner

*Primary Examiner*—Daniel H. Pan
(74) *Attorney, Agent, or Firm*—Akin, Gump, Strauss, Hauer & Feld, LLP

(57) ABSTRACT

The invention is a processing method and a processor architecture which contains multiple processors on the same silicon but which does not make a fixed compromise by statically assigning processing units to the processors but rather dynamically assigns such processing units so that they may be efficiently shared. The invention may provide the same functionality as was obtained with static allocation, and may be implemented on a single chip with much lower area for the same level of performance. The preferred architecture uses a mode bit that may be programatically set for passing control from a general purpose instruction decoder to a finite state machine. The preferred architecture further includes a multiplexer that uses the mode bit as its selection input.

19 Claims, 2 Drawing Sheets

METHOD FOR DYNAMIC ALLOCATION AND EFFICIENT SHARING OF FUNCTIONAL UNIT DATAPATHS

BACKGROUND OF THE INVENTION

1. Field of the Invention

The present invention relates generally to data processing structures and methods therefore and, more particularly, to a data processing architecture wherein alternative control mechanisms (i.e. an instruction-decoder and a specialized state machine) may be dynamically bound to a shared functional unit or group of functional units.

2. Description of Related Art

Microprocessors form a critical component of modern electronic devices. Various microprocessor architectures have developed, depending on the intended use of the device. All microprocessors, however, are based around one or more "functional units" or data path circuits that perform a specified operation such as an add function, a subtract function, a shift by one, and so on. The universe of functional units can generally be divided into two varieties: (1) general purpose functional units that may be programmatically controlled by way of an instruction stream and a suitable instruction-decoder and (2) special purpose functional units that are typically optimized to perform a single function (e.g. a multiply) and are typically controlled by a specialized finite state machine (FSM).

Viewing microprocessors as comprising functional units, one can logically see a range of available architectures that extends from a completely general architecture to a completely dedicated architecture. The Pentium processor made by Intel is an example of a completely general architecture, which does not contain any special purpose, dedicated functional units, but rather a plurality of general purpose functional units that are all controlled by an instruction pipeline. The advantage of such a general purpose processor is that all of the functional units are always available for use. Such generality, however, comes at the cost of size and performance because there is an inherently inefficient use of the microprocessors resources.

At the other end of the spectrum are fixed functionality microprocessors that contain only dedicated, special purpose functional units that are controlled by finite state machines. An integrated circuit designed to implement the MPEG-2 video compression standard, for example, is likely to contain such dedicated functional units and strict FSM control because it implements a very limited function.

In between the two extremes or paradigms, various industry members have designed and implemented microprocessors that incorporate both general purpose functional units controlled by an instruction stream, and special purpose functional units controlled by a finite state machine. In all known cases, however, such mixed-functionality microprocessors have implemented a static division or compromise between the two control mechanisms, i.e. between an instruction stream and corresponding instruction-decoder on one hand, and one or more finite state machines on the other hand. The functional units available for control by the various control mechanisms, in other words, are dedicated to those control mechanisms. In the known prior art therefore, the industry has either selected one of the extreme paradigms or has made compromise that was, in some cases, a fixed compromise. A functional unit takes data out of memory, operates on that data, and then puts the result back in memory. A control unit tells the functional unit what data to use or provides the functional unit with that data, depending on the point of view.

Microprocessors on the specialized end of the spectrum are often referred to as digital signal processors or DSPs. DSPs are often used in special purpose electronic devices such as, for example, wireless communication devices (cellular and portable phones) and modems. The DSPs in such devices often implement mathematically intensive algorithms such as Viterbi decoding, REED-SOLOMON decoding, and Fast Fourier Transforms, to name a few.

The processor architectures which have made a fixed compromise between general purpose and specialized functional units and appropriate control therefore have generally achieved their intended purpose of merging general purpose functionality with specialized, high speed data processing functionality. Such devices, however, are inefficient in that the various functional units, which must be provided to achieve the static compromise, are often idle when the processor executes multiple applications. The result of the static compromise, therefore, is a larger than necessary die-size, a more costly processor, additional power consumption, reduced speed and depending on other limiting issues, restricted applicability to new applications.

There remains a need, therefore, for a processor architecture which will efficiently combine the structures and resulting benefits of general purpose functional units and specialized functional units in such a way that they may be dynamically shared between two or more control mechanisms.

SUMMARY OF THE INVENTION

In one aspect, the invention may be regarded as a method of dynamically sharing a processing unit between multiple control mechanisms, the method comprising the steps of: providing a processing unit; providing an instruction decoder for executing a first program stored in a memory; providing a finite state machine for executing a second program according to the finite state machine; and dynamically assigning the processing unit to the instruction decoder and the finite state machine in accordance with the first and second programs.

In another aspect, the invention may be regarded as a multiprocessor IC comprising: a processing unit; a control pipeline including an instruction decoder and an output for issuing control signals to the processing unit; a finite state machine including an output for issuing control signals to the processing unit; and means for dynamically assigning the control signals from the instruction decoder and the control signals from the finite state machine to the processing unit.

BRIEF DESCRIPTION OF THE DRAWINGS

The just summarized invention may be best understood with reference to the drawings of which.

DETAILED DESCRIPTION OF THE PREFERRED EMBODIMENTS

In modern electronic devices, general purpose system control is implemented with appropriate firmware, an instruction decoder, and one or more general purpose execution units. In addition, however, it is often the case that certain functions must be implemented at very high speed and performance levels. In certain communications devices, for example, equalization, echo cancellation, Viterbi encoding and decoding, and so on, must generally be implemented with finite state machines that control more specialized functional units such as multipliers, adders, and multiply-accumulators (MACs).

The goal of this invention is to dynamically allocate processing units (execution units, functional units, or both) among two or more control mechanisms on a chip that has one or more general purpose processors or digital signal processors controlled by an instruction stream and one or more algorithm accelerators controlled by a finite state machine (FSM). The dynamic allocation approach is proposed instead of statically predetermining the division of resources on the chip as has been done in the past. In such context, the application developer may simply decide at run-time what resources will be used to implement a particular task. The result of this invention is the more efficient use of available on-chip resources. Consequently, the same functionality may be implemented on a single chip with much lower area and power for the same level of performance.

Figure 1:
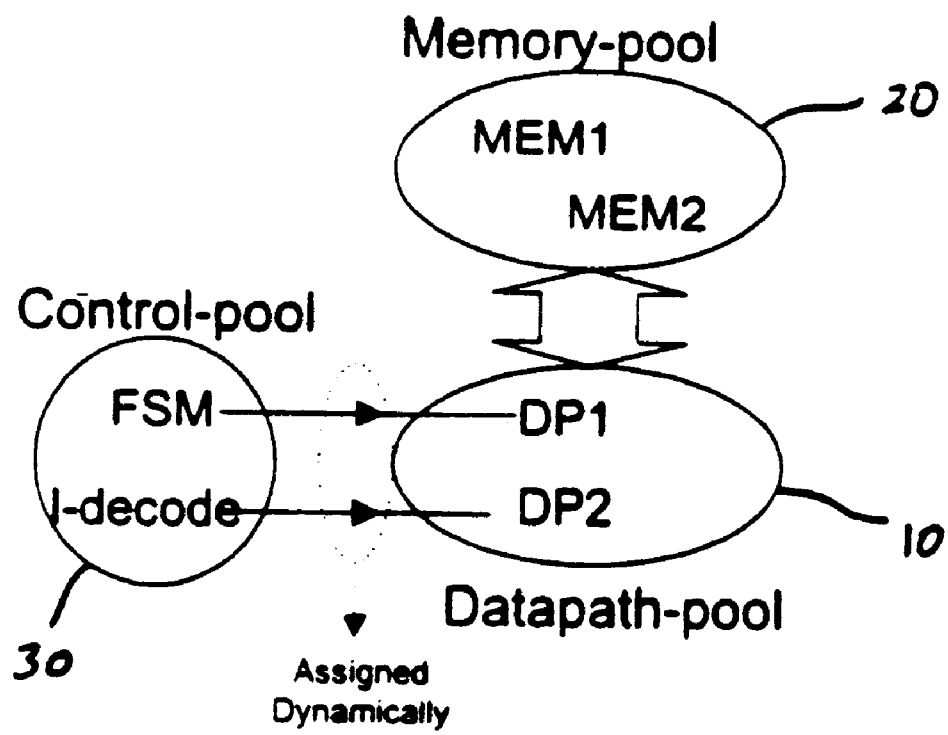
FIG. 1 is a high level diagram showing how a data path-pool of functional units that communicate with a memory-pool may be dynamically controlled by two of more control mechanisms such as a finite state machine or an instruction-decoder contained in the control-pool.

FIG. 1 is a high level diagram showing how a pool 10 of data paths DP1, DP2, or functional units, that communicate with a memory-pool 20 may be dynamically controlled by a control pool 30 of two of more control mechanisms such as a finite state machine FSM and an instruction-decoder. The invention here is to dynamically assign any one of the various control mechanisms in the control pool 30 to the functional units DP1, DP2 in the datapath pool 10.

Figure 2:
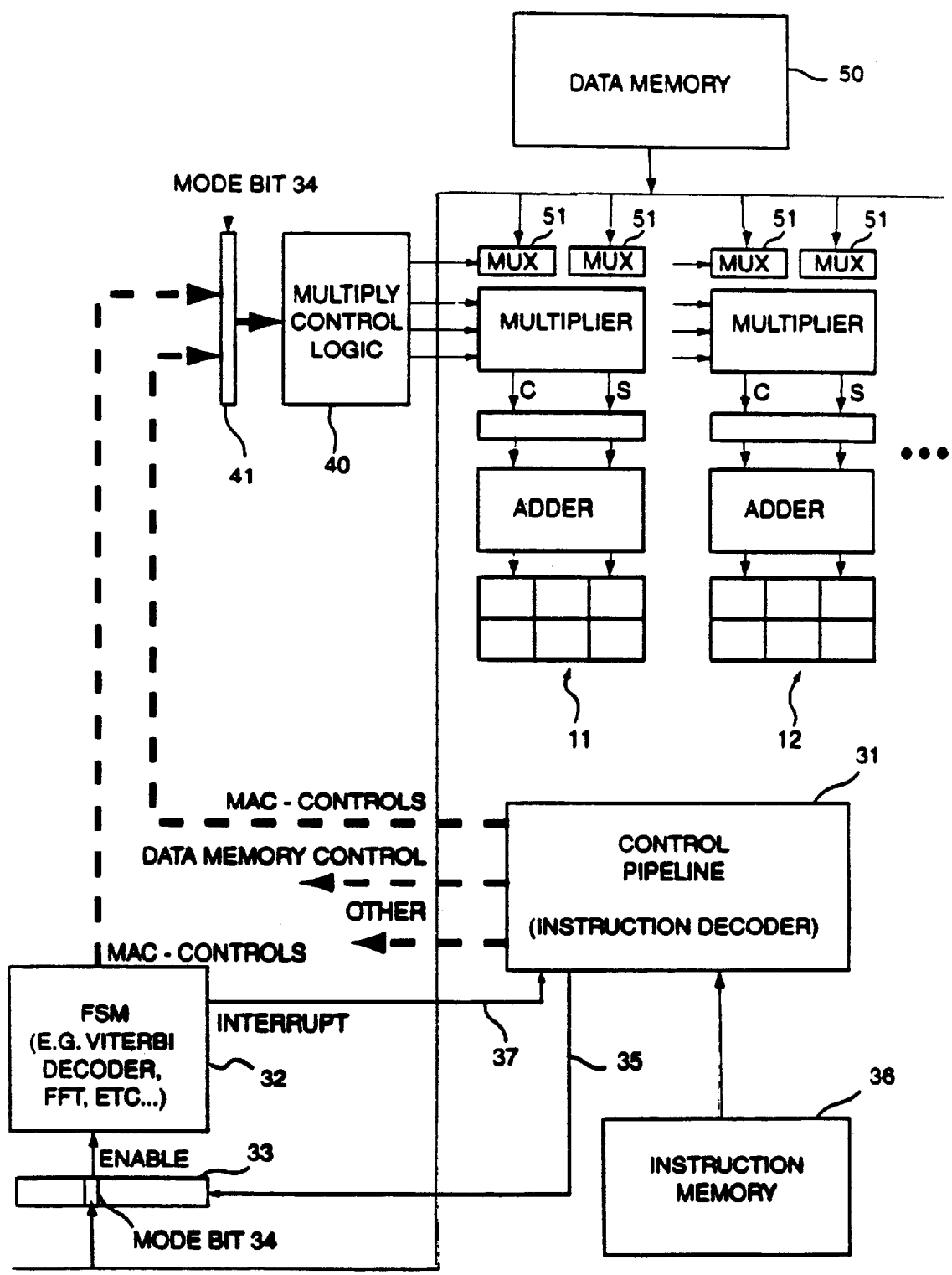
FIG. 2 is a schematic block diagram of a first preferred embodiment involving a dynamic control sharing arrangement between an instruction-decoder and one or more finite state machines.

FIG. 2 is a schematic block diagram of a first preferred embodiment involving a dynamic control-sharing arrangement for sharing functional units 11, 12, and so on, between a control pipeline 31 containing an instruction-decoder and a finite state machine (FSM) 32. As shown, the preferred dynamic sharing arrangement is based around a control register 33 which includes a "mode bit" 34 that the firmware may programatically set, as suggested by control line 35, to pass control to or "enable" the FSM 32.

The system of FIG. 2 operates as follows. Assuming that the control pipeline 31 has control of the functional units 11, 12, then firmware contained in an instruction memory is successively accessed and decoded by the instruction decoder to generate various control commands. Of relevance here are the MAC-CONTROLS which, by way of a multiplexer 41, reach a multiply control logic block 40 that controls the operation of the functional units 11, 12 and the operation of associated muxes 51 for retrieving data from a data memory 50.

Returning to the multiplexer 41, note that it is controlled by the mode bit 34 that was previously reset by the control pipeline. Whenever the value of the mode bit 34 is such that the FSM 32 is disabled, therefore, then the multiplexer 41 is controlled such that it transmits MAC-CONTROLS from the control pipeline 31 and not from the FSM 32. In the preferred embodiment, however, the instruction set is extended to include a special instruction (e.g. "Start FSM") which starts the FSM by setting the mode bit 34. At the same time, therefore, the mode bit 34 selects the FSM input of the multiplexer 41 such that it is the FSM 32 and not the control pipeline 31 that controls the functional units 11, 12. In the preferred embodiment, the FSM returns control to the control pipeline 31 after having completed its specialized task by way of an interrupt line 37. The "Start FSM" instruction may simply return control or it may, of course, include other parameters such as a predetermined location at which to continue execution.

It should be understood that there are many possible ways to implement the dynamic swapping of control, the system of FIG. 2 being merely one example.

I claim:

1. A method of controlling data flow in a computer system, the method comprising:
   selectively accessing, by an instruction decoder, at least one of a plurality of functional units of a processing unit;
   selectively accessing, by a finite state machine, at least one of the plurality of functional units of the processing unit; and
   dynamically assigning the instruction decoder and the finite state machine to access at least one of the plurality of functional units of the processing unit to control the flow of data in the computer system.

2. The method of claim 1 further comprising the instruction decoder controlling at least a portion of the data flow in the computer system and passing said control of the data flow in the computer system to the finite state machine according to instructions in the computer system.

3. The method of claim 1 wherein the at least one functional unit selectively accessed by the finite state machine is a specialized functional unit.

4. The method of claim 1 wherein the at least one functional unit selectively accessed by the instruction decoder is a general purpose execution unit.

5. The method of claim 1 further comprising the finite state machine controlling at least a portion of the data flow in the computer system and passing said control of the data flow in the computer system to the instruction decoder according to instructions in the computer system.

6. A processing architecture comprising:
   a processing unit having at least one functional unit that takes data out of memory, operates on that data, and then puts the result back in memory disposed therein;
   a first control mechanism that is configured to control flow of data in the at least one functional unit of the processing unit;
   a second control mechanism that is configured to control flow of data in the at least one functional unit of the processing unit; and
   a processor configured to dynamically assign either the first or second control mechanisms to at least one functional unit of the processing unit.

7. The processing architecture of claim 6 wherein the first control mechanism controls at least a portion of the data flow in the processing architecture and passes said control of the data flow in the processing architecture to the second control mechanism according to instructions in the processing architecture.

8. The processing architecture of claim 6 wherein the at least one functional unit of the processing unit is a specialized functional unit.

9. The processing architecture of claim 6 wherein the at least one functional unit of the processing unit is a general purpose execution unit.

10. The processing architecture of claim 6 wherein the first control mechanism comprises an instruction-decoder.

11. The processing architecture of claim 6 wherein the second control mechanism comprises a finite state machine.

12. The processing architecture of claim 6 wherein the second control mechanism controls at least a portion of the data flow in the processing architecture and passes said control of the data flow in the processing architecture to the first control mechanism according to instructions in the processing architecture.

13. A multiprocessor integrated chip comprising:

a processing unit having a plurality of functional units that take data out of memory, operate on that data, and then put the result back in memory;

a controller including an instruction decoder and a finite state machine, the controller issuing a plurality of control signals according to operations of the instruction decoder and/or the finite state machine; and the controller configured to dynamically assign the control signals from the controller to the processing unit.

14. The multiprocessor integrated chip of claim 13 wherein the controller further comprises a multiplexor that enables the instruction decoder to pass control of the processing unit to the finite state machine.

15. The multiprocessor integrated chip of claim 13 wherein the finite state machine of the controller interoperates with one of the functional units of the processing unit, the one of the functional units comprising a specialized functional unit.

16. The multiprocessor integrated chip of claim 13 wherein the controller dynamically assigns the control signals to the processing unit according to a first input signal received from the instruction decoder and a second input signal received from the finite state machine.

17. The multiprocessor integrated chip of claim 16 further comprising a control register having a mode bit that may be set by an instruction executing in the instruction decoder and reset by the finite state machine.

18. The multiprocessor integrated chip of claim 13 wherein at least one of the plurality of functional units of the processing unit comprises a specialized functional unit.

19. The multiprocessor integrated chip of claim 13 wherein at least one of the plurality of functional units of the processing unit comprises a general purpose execution unit.

* * * * *